United States Patent [19]

Schütze et al.

[11] 4,260,778
[45] Apr. 7, 1981

[54] PROCESS FOR THE PREPARATION OF THIOINDIGO COMPOUNDS

[75] Inventors: Detlef-Ingo Schütze, Bergisch-Gladbach; Klaus Wunderlich, Leverkusen, both of Fed. Rep. of Germany

[73] Assignee: Bayer Aktiengesellschaft, Leverkusen, Fed. Rep. of Germany

[21] Appl. No.: 40,520

[22] Filed: May 21, 1979

[30] Foreign Application Priority Data

Jun. 9, 1978 [DE] Fed. Rep. of Germany ....... 2825313

[51] Int. Cl.$^3$ ................................................ C09B 7/10
[52] U.S. Cl. ..................................................... 549/52
[58] Field of Search ........................... 260/331; 549/52

[56] References Cited

U.S. PATENT DOCUMENTS 2,158,032  5/1939  Lubs et al. ............................ 260/331

FOREIGN PATENT DOCUMENTS 360349  11/1931  United Kingdom ..................... 260/331

OTHER PUBLICATIONS

Kendall, General Chemistry, pp. 330 to 331, Revised Edition, copyrighted 1936 by D. Appleton-Century Co., Inc., (NY).

*Primary Examiner*—John D. Randolph
*Attorney, Agent, or Firm*—Sprung, Felfe, Horn, Lynch & Kramer

[57] ABSTRACT

Process for the preparation of thioindigo compounds of the formula

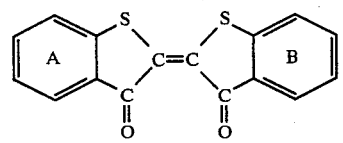 (I)

in which
A and B designate identical or different optionally substituted benzene rings or benzene rings onto which further carbocyclic and heterocyclic rings are fused,
characterized in that compounds of the formula

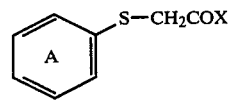 (IIa)

and/or

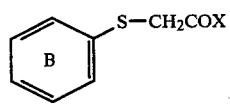 (IIb)

in which
A and B have the meaning indicated above and
X designates halogen, such as bromine and, preferably, chlorine,
are reacted in a liquid mixture of an aluminium halide, an alkali metal halide and $SO_2$ and the resulting intermediate product is then oxidized in a manner which is in itself known, if appropriate after first being isolated, and the mixture is worked up to give the compounds of the formula (I).

7 Claims, No Drawings

PROCESS FOR THE PREPARATION OF THIOINDIGO COMPOUNDS

Of the known syntheses for thioindigo compounds, the process of German Pat. No. 241,910 in which symmetric thioindigo derivatives are obtained by reacting substituted arylthioglycolic acids with chlorosulphonic acid at 35° C. may first be mentioned. In another process (German Pat. Nos. 246,265 and 248,264), symmetric substituted thioindigo derivatives are obtained by reacting substituted arylthioglycolic acids in monohydrate or concentrated sulphuric acid. The disadvantage of these processes is that, because of the formation of dyestuff-sulphonic acids in a side reaction, they can be used only to a limited extent.

In a further process (Russian Pat. No. 327,218; reviewed in DE-OS (German Published Specification) No. 2,457,703), 2,5-dichlorophenyl-thioglycolic acid, for example, is reacted with chlorosulphonic acid only to the 3-hydroxy-4, 7-dichloro-1-thionapthene stage. This intermediate product is isolated and oxidised with sodium polysulphide to give tetrachloro-thioindigo.

In another process (German Pat. No. 197,162), arylthioglycolic acids are first converted into the acid chlorides, which are then cyclised with aluminum chloride and the cyclisation product is finally oxidised with complex iron-III salts. The yields in the case of this process are not very high.

Finally, the process of U.S. Pat. No. 2,158,032 may be mentioned, in which arylthioglycolic acids are converted into the acid chlorides with phosphorus trichloride in chlorobenzene or similar solvents and the acid chlorides are then cyclised to give the 3-hydroxy-1-thionaphthene derivatives, aluminum chloride being added, and these derivatives are then reacted, by oxidation, to give the thioindigo derivatives.

It has now been found that thioindigo and derivatives thereof are obtained in a surprisingly advantageous manner when the acid halides of arylthioglycolic acids are reacted in a liquid mixture of an aluminum halide, an alkali metal halide and $SO_2$ and the reaction product formed is oxidised in a manner which is in itself known, if appropriate after first being isolated, and the mixture is worked up to give the thioindigo derivatives to be expected.

The thioindigo compounds obtainable according to the invention can be represented by the formula

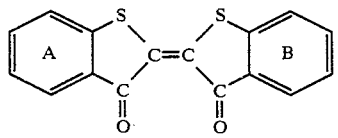
(I)

in which
A and B designate identical or different, optionally substituted benzene rings or benzene rings onto which further carbocyclic and heterocyclic rings are fused.
Compounds of the formulae

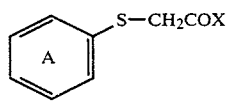
(IIa)

and/or

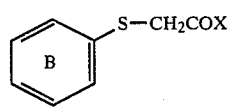
(IIb)

in which
A and B have the meaning indicated above and
X designates halogen, such as bromine and, preferably, chlorine, are used as starting materials for their preparation and are reacted in a liquid mixture of an aluminium halide, an alkali metal halide and $SO_2$.

The 3-hydroxy-1-thionaphthene derivative formed is then oxidised in a manner which is in itself known (see, for example DE-OS (German Published Specification) No. 2,457,703), if appropriate after first being isolated, and the mixture is worked up to give the compounds of the formula (I).

The process is particularly suitable for the preparation of compounds of the formula (I) in which A and B designate benzene rings which unsubstituted or which each carry 1,2,3 or 4 substituents from the series comprising halogen, nitro, trifluoromethyl, alkyl, alkoxy, aryloxy, acylamino, alkylmercapto and —COR, R representing alkyl, aryl, alkoxy or optionally substituted amino, and also for the preparation of compounds of the formula (I) in which a carbocyclic-aromatic or heterocyclic-aromatic ring is fused onto the rings A and B, which optionally carry 1 or 2 substituents.

Compounds of the formula (I) in which the rings A and B carry 1, 2, 3 or 4 substituents from the series comprising chlorine, bromine, nitro, $C_1$–$C_4$-alkyl and $C_1$–$C_4$-alkoxy, or in which the benzene rings A and B are part of an α-naphthyl or β-naphthyl ring can be prepared in a particularly smooth manner.

The new process earns particular interest for the preparation of tetrachlorothioindigo, having the structure

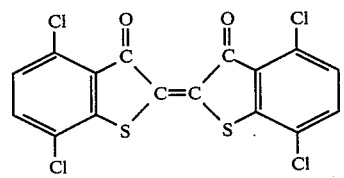

The starting compounds of the formulae (IIa) and (IIb) employed for carrying out the process are known from the literature, or they can be prepared by procedures analogous to those known from the literature.

Suitable aluminium halides are Al $Br_3$, and preferably Al $Cl_3$. The alkali metal halides preferably employed are the chlorides and bromides of Na and K, in particular NaCl.

The amount of aluminium halide to be employed can be varied within wide limits. 1.1 to 8 mols of catalyst, preferably 3 to 6 mols, are used per mol of acid halide of the arylthioglycolic acid. To this are added 0.15 to 1.2 mols, preferably 0.45 to 0.9 mol, of alkali metal halide and an amount of $SO_2$ (about 25 g to 200 g) such that a clear melt is formed.

The reaction temperature is in the range from about 0° C. to about 30° C., preferably in the range from about 10° C. to about 20° C.

The procedure for carrying out the process in practice is to add the acid chloride of the arylthioglycolic acid, such as, for example, the acid chloride of 2,5-dichlorophenyl-thioglycolic acid, to a liquid mixture of an aluminium halide, an alkali metal halide and $SO_2$, such as, for example, the mixture $AlCl_3/NaCl/SO_2$, in a manner such that the reaction temperature is between 0° C. and 30° C., preferably between 10° C. and 20° C.

The 3-hydroxy-1-thionaphthene compound formed can then be oxidised to the thioindigo compound, either directly or after intermediate isolation. In the case of intermediate isolation, the melt is stirred into water, which has been acidified, for example with hydrochloric acid, and the mixture is filtered. The filter cake is then worked into a slurry and oxidised directly in water which has been rendered alkaline by adding bases, such as sodium hydroxide, potassium hydroxide, sodium carbonate, ammonia or barium hydroxide. The process is preferably carried out at a pH between 9 and 14. If no intermediate isolation takes place, the melt is then added directly to water which has been rendered alkaline with one of the abovementioned bases.

Oxidation can then be carried out with oxygen, oxygen-containing gases, for example air, potassium dichromate, sodium polysulphide, complex iron-III salts, ammonium peroxodisulphate or other oxidising agents.

Besides water, the oxidation can also be carried out in an aqueous-organic phase, such as water/pyridine, water/ethoxyethanol, water/ethanol, water/diethylene glycol monoethyl ether or similar mixtures.

The temperatures for the oxidation are between 10° C. and the boiling point of the mixture, preferably 50° C. to 100° C.

If the oxidation is carried out with oxygen or air, catalysts, such as metal salts, oxides or hydroxides which contain a transition metal, for example copper, cobalt, manganese or iron, as the metal can be used to accelerate the oxidation reaction.

When the oxidation has ended, the progress of which can be followed with the aid of the decrease in the intermediate product 3-hydroxy-1-thionaphthene, for example by chromatography or by measuring the redox potential, the reaction product is isolated in the customary manner by filtering the mixture and washing the material on the filter with water if intermediate isolation has taken place. In the other case, after filtering, the material on the filter is washed first with dilute sodium hydroxide solution and then with water.

In order to achieve optimum pigment properties for the thioindigo compound, the reaction mixture can be stirred during the oxidation, or thereafter, with an added emulsifier or dispersing agent.

The thioindigo compounds obtainable by the process according to the invention are used as dyestuffs for the most diverse fields of application and the most diverse substrates.

In particular, the halogen-substituted thioindigo derivatives are brilliant pigments of high tinctorial strength and excellent fastness properties, it also being possible to achieve the valuable pigment properties of these products by subsequent finishing methods.

As has already been known for a long time, the dyestuffs obtainable are also particularly suitable as vat dyestuffs for dyeing cotton.

The process according to the invention enables the thioindigo compounds of the formula (I) to be obtained in high yields in a smooth reaction and in a manner which is advantageous from an ecological point of view.

EXAMPLE 1

80 g of 2,5-dichlorophenyl-thioglycolic acid are introduced into 100 ml of thionyl chloride and the mixture is heated to the reflux until a complete reaction is achieved. The excess thionyl chloride is then distilled off and the acid chloride of 2,5-dichlorophenyl-thioglycolic acid, which has been cooled to about 30° C., is added dropwise to a melt consisting of 140 g of ground aluminium chloride/28 g of dried sodium chloride/80 g of sulphur dioxide at about 15° C.

After the addition, the melt is subsequently stirred at 15° C. for a further 3–4 hours. It is then introduced into 750 g of ice/125 ml of 36% strength hydrochloric acid, the mixture is subsequently stirred for ½ an hour and the solid is filtered off and washed with water. The moist filter cake of 3-hydroxyl-4,7-dichloro-1-thionaphthene is then stirred in 750 ml of water/98 g of 45% strength sodium hydroxide solution and the mixture is warmed to 75°–80° C. After adding 2 g of copper sulphate in 10 ml of water, air is then passed through the mixture at 80° C. for 10 hours until no further 3-hydroxyl-4,7-dichloro-1-thionaphthene can be detected by chromatography.

The solid is filtered off hot and washed with hot water until the runnings have a pH of 10–11. The material on the filter is then stirred in 2,600 ml of water/60 ml of 36% strength hydrochloric acid, and 0.5 g of a commercially available dispersing agent is added. The suspension is kept at 70° C. for 1 hour and the solid is filtered off hot, washed until neutral and dried at 60°–70° C.

67.5 g of a red-violet powder (93% of theory) are obtained.

EXAMPLE 2

The procedure followed is as in Example 1, except that the 3-hydroxy-4,7-dichloro-1-thionaphthene is not isolated but the $AlCl_3/NaCl/SO_2$ melt is introduced directly into 750 g of ice/480 g of 45% strength sodium hydroxide solution. The sulphite is then first oxidised with 200 ml of 35% strength hydrogen superoxide solution at 20°–25° C. Thereafter, 96 g of 45% strength sodium hydroxide solution are added, the mixture is warmed to 80° C., 4 g of potassium permanganate are added and oxidation is carried out by passing air in at 80° C. for 10 hours. Finally, the mixture is warmed to 95°–100° C. for a further 2 hours and the solid is filtered off hot and washed with hot 5% strength sodium hydroxide solution and then with hot water.

The moist filter cake is stirred in 2,600 ml of water/60 ml of 36% strength hydrochloric acid and the mixture is warmed to 70° C. and, after adding 2.5 g of oxalic acid and 0.5 g of a commercially available dispersing agent, is kept at 70° C. for a further ½ an hour. Thereafter, the solid is filtered off, washed with water and dried at 60°–70° C.

63.3 g of a red-violet powder (87.2% of theory) are obtained.

EXAMPLE 3

The procedure followed is as in Example 1, except that the 3-hydroxy-4,7-dichloro-1-thionaphthene is not isolated but the $AlCl_3/NaCl/SO_2$ melt is introduced directly into 1,000 g of ice/480 g of 50% strength sodium hydroxide solution. After adding 6.8 g of iron-III chloride, dissolved in 40 ml of water, 800 ml of sodium hypochlorite solution are next added dropwise. The mixture is then heated to 80° C. and oxidation is carried out by passing air in for about 8 hours.

After the mixture has been warmed to 95°-100° C. for a further 2 hours, the solid is filtered off hot and washed with hot sodium hydroxide solution and then with water.

The moist filter cake is stirred in 2,600 ml of water/62 ml of 36% strength hydrochloric acid and the mixture is warmed to 70° C. and, after adding 0.5 g of a commercially available dispersing agent, is stirred at 70° C. for a further ½ an hour. Thereafter, the solid is filtered off, washed with water and dried at 60°-70° C.

64.6 g of a red-violet powder (89% of theory) are obtained.

EXAMPLE 4

34.2 g of 4-chlorophenyl-thioglycolic acid are introduced into 50 ml of thionyl chloride and the mixture is heated to the reflux until a complete reaction is achieved. The excess thionyl chloride is then distilled off and the acid chloride, which has been cooled to about 30° C., is added dropwise to a melt consisting of 70 g of ground aluminium chloride/14 g of dried sodium chloride/40 g of sulphur dioxide at about 15° C. The melt is then stirred at 10°-15° C. for 15 hours. It is then added to 375 g of ice/63 ml of 36% strength hydrochloric acid, the mixture is subsequently stirred for ½ an hour and the solid is filtered off and washed with water.

The moist filter cake is then worked into a slurry in 250 ml of water which has been rendered alkaline with 50 g of 50% strength sodium hydroxide solution, the mixture is heated to 80° C., 3.4 g of iron-III chloride are added and oxidation is carried out by passing air in. After about 10 hours, the mixture is stirred at 95°-100° C. for a further 1 hour and the solid is filtered off hot and washed with hot water until the runnings have a pH value of 10-11.

The moist filter cake is worked into a slurry in 1,300 ml of water/31 ml of 36% strength hydrochloric acid and, after adding 0.5 g of a commercially available dispersing agent, the mixture is stirred at 70° C. for 1 hour. Thereafter, the solid is filtered off hot, washed with water and dried at 60°-70° C. 23.7 g of a violet powder (77% of theory) are obtained.

The dyestuff dyes cotton, from its vat, in violet shades.

EXAMPLE 5

40 g of 4-chloro-2-methylphenyl-thioglycolic acid are heated to the reflux in 50 ml of thionyl chloride until a complete reaction to give the acid chloride has taken place. The excess thionyl chloride is then distilled off and the acid chloride, which has been cooled to about 30° C., is added dropwise to a melt consisting of 70 g of ground aluminium chloride/14 g of dried sodium chloride/40 g of sulphur dioxide at 15° C. The melt is then subsequently stirred at 15° C. for 10 hours. Thereafter, it is introduced into 375 g of ice/63 ml of 36% strength hydrochloric acid, the mixture is stirred for ½ an hour, the solid is filtered off and washed with water and the moist filter cake is stirred in 250 ml of ice-water/50 g of 50% strength sodium hydroxide solution. The mixture is then heated to 75°-80° C., 1 g of copper sulphate, dissolved in 10 ml of water, is added and oxidation is carried out with air for 10 hours. After the mixture has been stirred at 95°-100° C. for a further 1 hour, the solid is filtered off hot, washed with hot water and again worked into a slurry in 1,300 ml of water/31 ml of 35% strength hydrochloric acid. After adding 0.5 g of a commercially available dispersing agent, the mixture is stirred at 70° C. for 1 hour. The solid is then filtered off, washed until neutral and dried at 60°-70° C. 30.5 g of a red powder (83% of theory) are obtained.

Besides its suitability as a pigment, the dyestuff also dyes cotton, from its vat, in red-violet shades.

The dyestuffs of Examples 6–20 were prepared in a manner analogous to Examples 1–5:

| Example | Thioglycolic acid | Shade on cotton |
| --- | --- | --- |
| 6 | 3-Chlorophenyl-thioglycolic acid | red |
| 7 | 2-Chlorophenyl-thioglycolic acid | red |
| 8 | 3-Methylphenyl-thioglycolic acid | red |
| 9 | 2-Methylphenyl-thioglycolic acid | bluish-red |
| 10 | 4-Methylphenyl-thioglycolic acid | bluish-red |
| 11 | 2,4-Dichlorophenyl-thioglycolic acid | red-violet |
| 12 | 2-Methyl-5-chlorophenyl-thioglycolic acid | red |
| 13 | 2,5-Dimethyl-4-chlorophenyl-thioglycolic acid | red-violet |
| 14 | 2,4-Dichloro-5-methylphenyl-thioglycolic acid | red-violet |
| 15 | 4-Nitrophenyl-thioglycolic acid | greenish-blue |
| 16 | 4-Methoxyphenyl-thioglycolic acid | bluish |
| 17 | 3-Ethoxyphenyl-thioglycolic acid | yellow-red |
| 18 | 3-Methoxy-4-chlorophenyl-thioglycolic acid | brick red |
| 19 | α-Naphthyl-thioglycolic acid | blue-grey |
| 20 | β-Naphthyl-thioglycolic acid | brown |

We claim:
1. A process for the preparation of thioindigo compounds of the formula

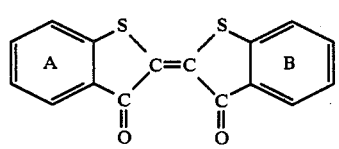

(I)

in which
A and B designate and identical or different unsubstituted benzene rings or benzene rings which each carry 1,2,3 or 4 substituents from the series comprising halogen, nitro, trifluoromethyl, alkyl, alkoxy, aryloxy, acylamino, alkylmercapto and —COR, R representing alkyl, aryl, alkoxy or amino which can be substituted or benzene rings onto which further carbocyclic and heterocyclic rings are fused which rings can carry one or two of said substituents, which comprises contacting a compound of one of the following formulae

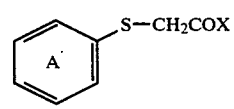

(IIa)

and/or

-continued

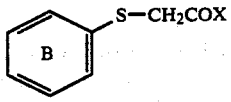

in which
A and B have the meaning indicated above and
X designates halogen in a liquid mixture consisting essentially of a melt consisting essentially of said compound (IIa) and/or (IIIa), aluminum halide, an alkali metal halide and $SO_2$ and oxidizing the resulting intermediate product and thereafter working up the mixture to give a compound of the formula (I).

2. Process according to claim 1, characterised in that $AlCl_3$ is used as the aluminium halide.

3. Process according to claim 1, characterised in that NaCl is used as the alkali metal halide.

4. Process according to claim 1, characterised in that 1.1 to 8 mols of aluminium halide, 0.15 to 1.2 mols of alkali metal halide and an amount of $SO_2$ such that a clear melt is formed are employed per mol of acid halide.

5. Process according to claim 1, characterised in that the reaction is carried out at about 0° C. to about 30° C., preferably about 10° C. to about 20° C.

6. A process according to claim 1 wherein 2,5-dichlorophenyl-thioglycolic acid chloride is reacted with said aluminum halide, alkali metal halide and $SO_2$.

7. A process according to claim 1, wherein the oxidation is carried out in an alkaline medium.

* * * * *